United States Patent [19]

Maruno et al.

[11] Patent Number: 5,329,594
[45] Date of Patent: Jul. 12, 1994

[54] RECOGNIZING AND JUDGING APPARATUS

[75] Inventors: Susumu Maruno, Osaka; Shigeo Sakaue, Moriguchi; Toshiyuki Kohda, Takatsuki; Yoshihiro Kojima, Kobe, all of Japan

[73] Assignee: Matsushita Electric Industrial Co., Ltd., Osaka, Japan

[21] Appl. No.: 845,248

[22] Filed: Mar. 3, 1992

[30] Foreign Application Priority Data

Mar. 6, 1991 [JP] Japan .............................. 3-39912
May 1, 1991 [JP] Japan ............................. 3-100035

[51] Int. Cl.$^5$ .............................................. G06K 9/62
[52] U.S. Cl. ....................................... 382/14; 382/37; 395/24; 395/27
[58] Field of Search .............. 382/37, 14, 38, 27, 382/15; 395/24, 27

[56] References Cited

U.S. PATENT DOCUMENTS

| | | | |
|---|---|---|---|
| 3,967,242 | 6/1976 | Isoo et al. | 382/28 |
| 5,052,043 | 9/1991 | Gaborski | 382/14 |
| 5,058,184 | 10/1991 | Fukushima | 382/37 |
| 5,265,224 | 11/1993 | Maruno | 395/24 |

OTHER PUBLICATIONS

Computer World '90 Nov. 7, 1989, Kobe, Japan; pp. 202-209; S. Maruno, "Multifunctional Layered Network Using Quantizer Neurons".
Int. Joint Conf. on Neural Networks, vol. II, Jun. 1989, pp. 439-442, XP119174; Y. Tan et al. "A Network with Multipartioning Units".
IEEE Transactions on Computers, vol. C-23, No. 12, Dec. 1974, New York, U.S.A., pp. 1250-1257; K. E. Sahin, "Message-Based Response Routine with Selcuk Network", p. 1251, left column, line 5-right column, line 4; p. 1256, left column, line 6-line 41.

Primary Examiner—Joseph Mancuso
Assistant Examiner—Steven P. Klocinski
Attorney, Agent, or Firm—Wenderoth, Lind & Ponack

[57] ABSTRACT

A recognizing and judging apparatus has a network organized in a multilayered hierarchical manner and a plurality of branched tree structures corresponding to the number of inputted data. The branched tree structures are organized by a plurality of recognition units, each of which includes a signal input section and a quantizer for performing a quantization according to a signal inputted from the signal input section. Each of the recognition units further includes a path input section having at least one path input terminal, a path output section having at least one path output terminal, and a path selecting section operatively coupled with both the path input section and the path output section for performing a selection of paths according to an output of the quantizer.

3 Claims, 6 Drawing Sheets

RECOGNIZING AND JUDGING APPARATUS

BACKGROUND OF THE INVENTION

1. Field of the Invention

The present invention relates to a recognizing and judging apparatus capable of recognizing and judging an object according to various characteristic data thereof.

2. Description of the Prior Art

FIG. 1 is a block diagram of a conventional recognizing and judging apparatus, which comprises a template comparator 1 having a signal input terminal 2 and a signal output terminal 3, a plurality of templates 4–7 indicative of input signal patterns prepared in advance, and a learning device 8 having a teacher signal input terminal 9.

A series of signals representative of an object to be recognized are inputted from the signal input terminal 2 to the template comparator 1. The template comparator 1 compares a pattern of the inputted signals with each of the templates 4–7 and outputs the number of a template having the smallest deviation as the result of recognition from the signal output terminal 3. If the output result is incorrect, the number of a template to which the inputted signals should belong is inputted from the teacher signal input terminal 9 to the learning device 8, thereby modifying an appropriate template to improve the recognition percentage.

In the conventional recognizing and judging apparatus as described above, the inputted signals representative of an object to be recognized are merely compared with the templates and operations are performed to obtain deviations therebetween. Accordingly, if inputted data vary, there arises a problem in that the recognition percentage would be lowered. Furthermore, because it is necessary to compare the inputted signals with all the templates, it takes very long time to perform comparisons. In addition, because it is necessary to prepare the same number of templates as the kinds of patterns to be classified and recognized, a memory having a large capacity for storing all the templates is required. In addition, the learning performed upon modifying an appropriate template requires a lot of time.

SUMMARY OF THE INVENTION

The present invention has been developed to overcome the above-described disadvantages.

It is accordingly an object of the present invention to provide an improved recognizing and judging apparatus which enables learning and recognizing processings to be effectively performed within a short period of time without requiring any templates.

In accomplishing this and other objects, a recognizing and judging apparatus according to the present invention has a network organized in a multilayered hierarchical manner and a plurality of branched tree structures corresponding to the number of inputted data. The branched tree structures are organized by a plurality of recognition units. Each of the recognition units comprises a signal input section, a quantizer for performing a quantization according to a signal inputted from the signal input section, a path input section having at least one path input terminal, a path output section having at least one path output terminal, and a path selecting section operatively coupled with both the path input and output sections for performing a selection of paths according to an output of the quantizer.

Preferably, the path selecting section comprises a loader for changing the strength of connection between the path input terminal and the path output terminal according to the output of the quantizer. In each of the recognition units located on a layer adjacent to the lowermost layer, the path selecting section may comprise a learning device for changing the strength of connection between the path input terminal and a path output terminal indicated by the output of the quantizer.

Conveniently, the learning device comprises a maximum-output-terminal detector for detecting a path output terminal from which a maximum path signal is outputted, a comparator for comparing the number of the path output terminal detected by the maximum-output-terminal detector and the number of a path output terminal indicated by the output of the quantizer, and a load increaser for increasing the strength of connection between the path input terminal and the path output terminal based on the result of the comparison performed by the comparator.

Advantageously, the recognizing and judging apparatus further comprises a plurality of differential measuring means for performing respective operations required to obtain differential values between signals inputted into the recognition units located on the same layer in two adjoining branched tree structures. In this case, an output from the differential measuring means provided in each tree structure is inputted into the signal input terminals of recognition units located on the next-lower layer.

Preferably, in each of the recognition units located on the lowermost layer, the path input section comprises an adder for adding input signals from a plurality of the path input terminals, whereas the path output section comprises a threshold processor for performing a threshold processing with respect to an output signal from the adder.

In the apparatus having the above-described construction, various characteristic data of an object to be recognized are initially inputted to the signal input sections of the recognition units located on one or more upper layers. Connection paths between the recognition units located on one layer and those located on the next-lower layer are then appropriately switched according to outputs of the quantizers, thereby selectively determining desired paths leading to the lowermost layer to obtain the result of recognition.

During learning, in each of the recognition units located on the preceding layer of the lowermost layer, it is sufficient if the strength of connection between the path input terminal and the path output terminal indicated by the quantizer is changed by the learning device.

Accordingly, recognition and learning processings can be performed at a high speed.

BRIEF DESCRIPTION OF THE DRAWINGS

This and other objects and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

The term "quantize" as employed throughout this application is defined as "to map input data into discrete values".

Figure 1:
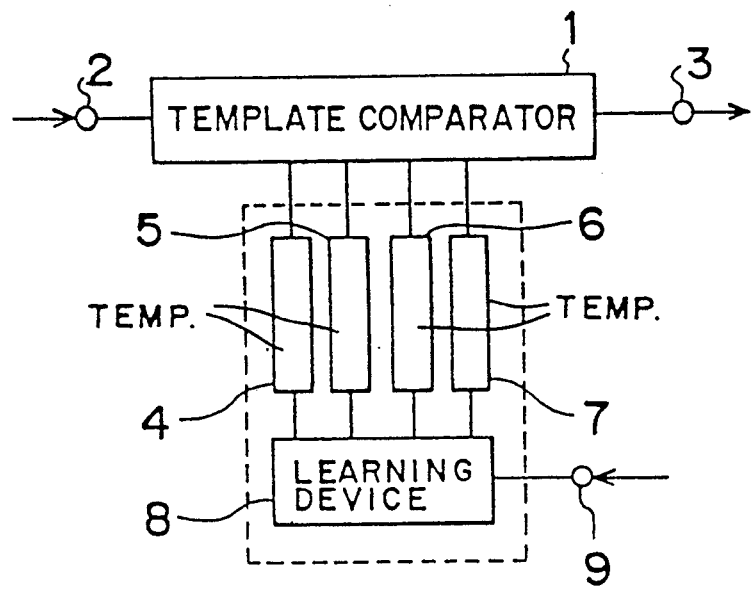
FIG. 1 is a block diagram of a conventional recognizing and judging apparatus.
Figure 2:
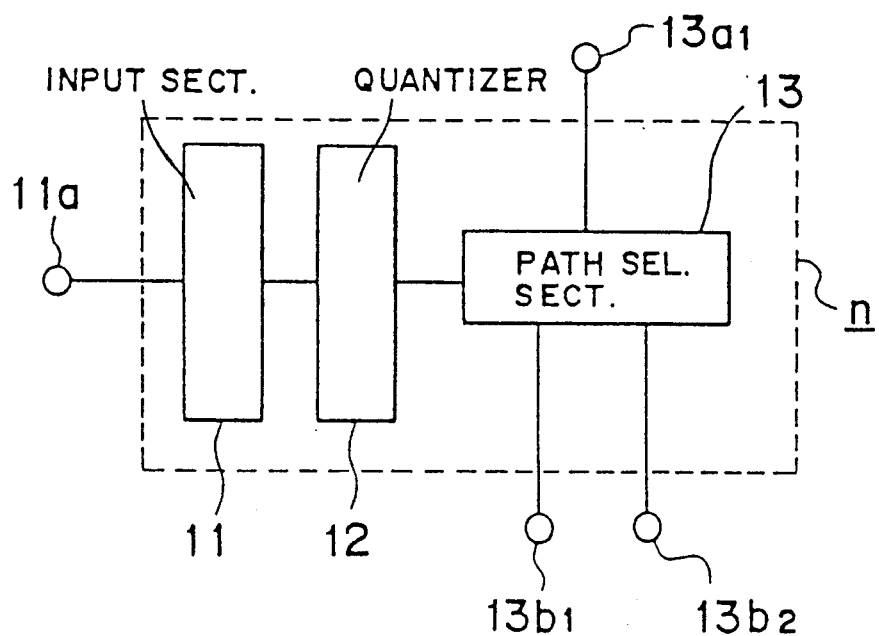
FIG. 2 is a block diagram of a recognition unit employed in a recognizing and judging apparatus according to the present invention.

Referring now to the drawings, there is schematically shown in FIG. 2 a recognition unit employed in a recognizing and judging apparatus according to the present invention. The recognition unit comprises a signal input section 11 to which are inputted characteristic data to be recognized via a signal input terminal 11a, a quantizer 12 for quantizing the inputted characteristic data, and a path selecting section 13 for switching the connection between a path input terminal $13a_1$ and path output terminals $13b_1$ and $13b_2$ based on a value quantized by and inputted from the quantizer 12. When a network is organized by a combination of a plurality of recognition units, respective terminals $13a_1$, $13b_1$ and $13b_2$ of the recognition units are appropriately connected with one another.

Figure 3:
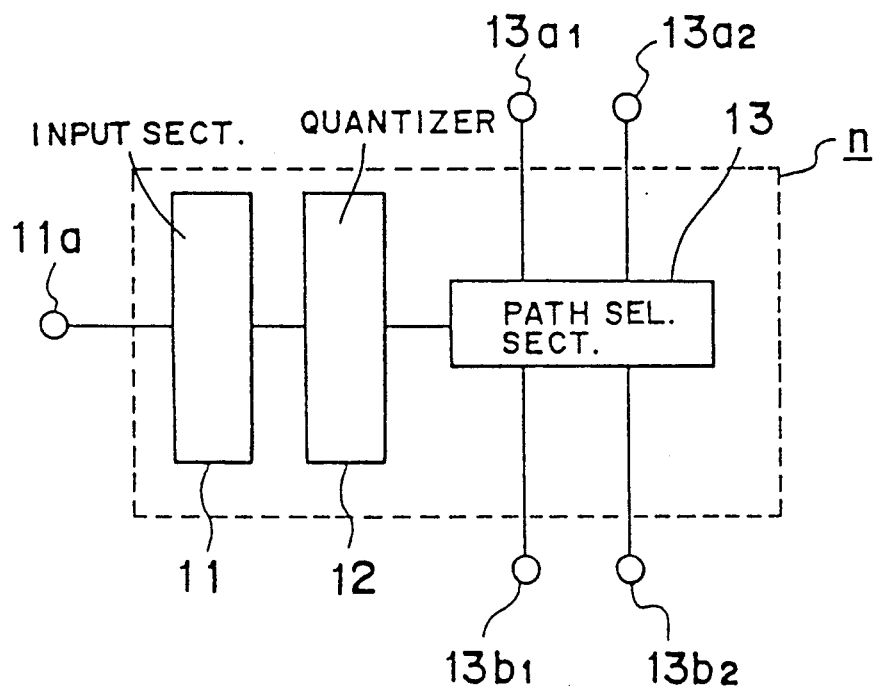
FIG. 3 is a diagram similar to FIG. 2, showing a modification of the recognition unit.

FIG. 3 schematically shows a modification of the recognition unit, in which are provided a plurality of path input terminals (in this case, two terminals $13a_1$ and $13a_2$). This recognition unit can be operated similarly to that shown in FIG. 2.

Figure 4:
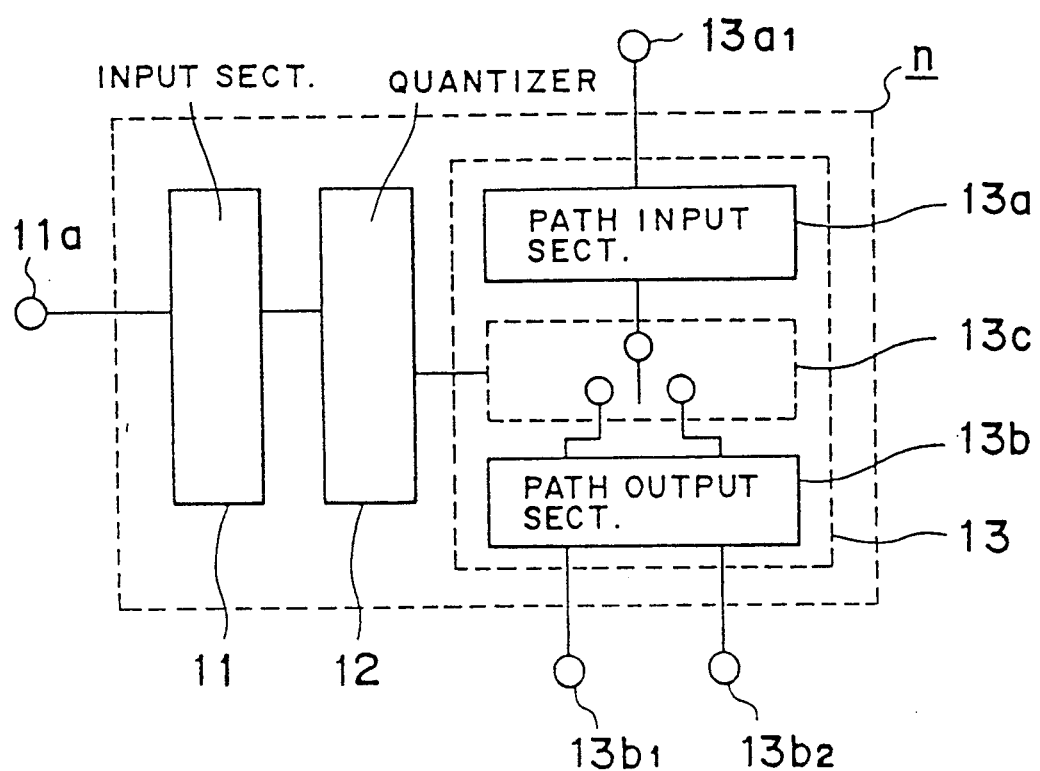
FIG. 4 is a diagram similar to FIG. 2, showing another modification of the recognition unit.

FIG. 4 schematically shows another modification of the recognition unit. In this unit, a path selecting section 13 comprises a path input section 13a having one path input terminal $13a_1$, a path output section 13b having two path output terminals $13b_1$ and $13b_2$, and a switch 13c operatively coupled with both the path input section 13a and the path output section 13b. The switch 13c switches the connection between the path input terminal $13a_1$ of the path input section 13a and the path output terminals $13b_1$ and $13b_2$ of the path output section 13b based on a value inputted thereto from a quantizer 12.

Figure 5:
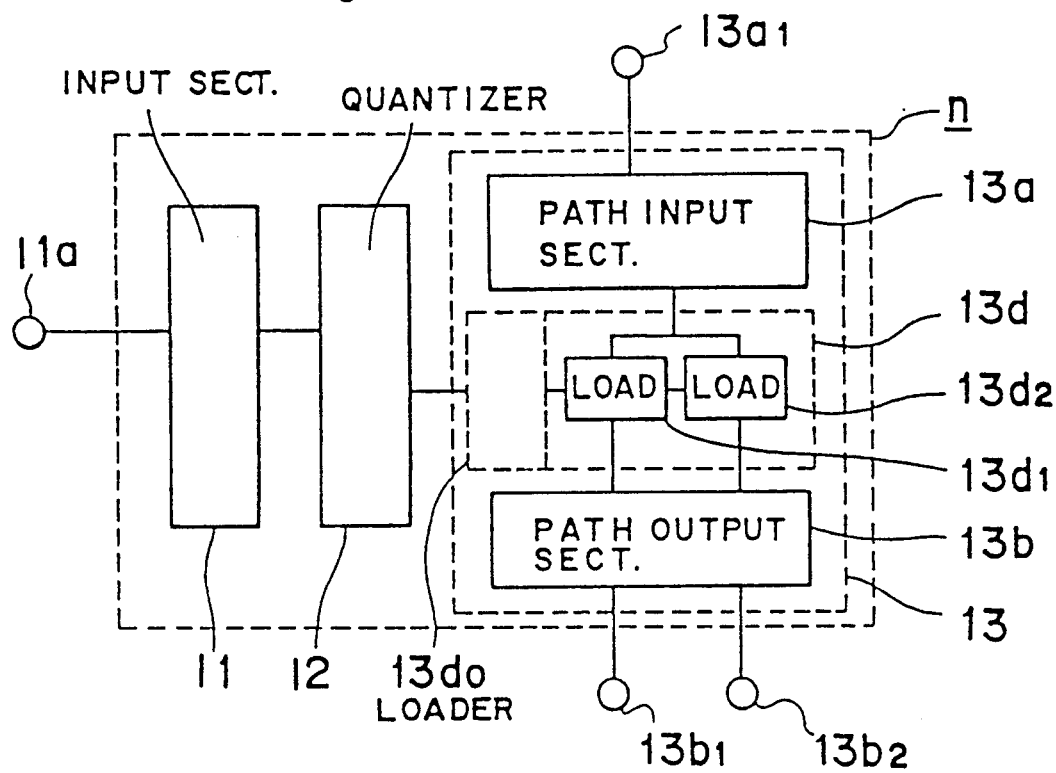
FIG. 5 is a diagram similar to FIG. 2, showing a further modification of the recognition unit.

FIG. 5 schematically shows a further modification of the recognition unit. In this unit, a path selecting section 13 comprises a path input section 13a having one path input terminal $13a_1$, a path output section 13b having two path output terminals $13b_1$ and $13b_2$, and a path loading section 13d. Loads $13d_1$ and $13d_2$ are weights to be applied to path output signals, which are outputted to the path output terminals $13b_1$ and $13b_2$ of the path output section 13b, respectively. A loader $13d_0$ changes these loads according to a value outputted from a quantizer 12. The loads $13d_1$ and $13d_2$ weight a path signal inputted from the path input section, whereas the path output section 13b outputs weighted path signals to the path output terminals $13b_1$ and $13b_2$.

Figure 6:
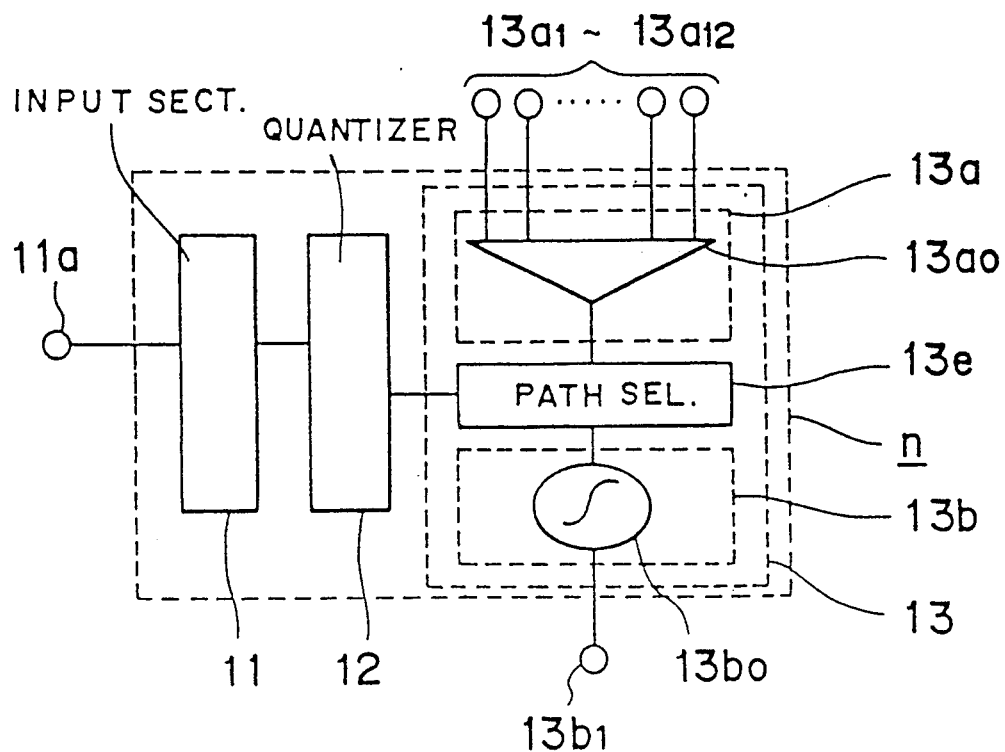
FIG. 6 is a diagram similar to FIG. 2, showing a still further modification of the recognition unit.

FIG. 6 schematically shows a still further modification of the recognition unit. In this unit, a path input section 13a comprises an adder $13a_0$ for adding input signals from a plurality of path input terminals whereas a path output section 13b comprises a threshold processor $13b_0$ for performing a threshold processing with respect to path signals. The adder $13a_0$ adds path signals inputted from twelve path input terminals $13a_1$–$13a_{12}$ and inputs the result of addition to a path selector 13e. The path selector 13e determines how to output a signal obtained through the addition to the path output terminal according to a value outputted from a quantizer 12. The path selector 13e may be of either the construction as shown in FIG. 4 or that as shown in FIG. 5. Because only one path output terminal is provided in the path output section, the path selector 13e determines whether or not the path signal should be outputted in the case where the construction as shown in FIG. 4 is employed or the path selector 13e merely changes the load for weighting the path signal in the case where the construction as shown in FIG. 5 is employed.

Figure 7:
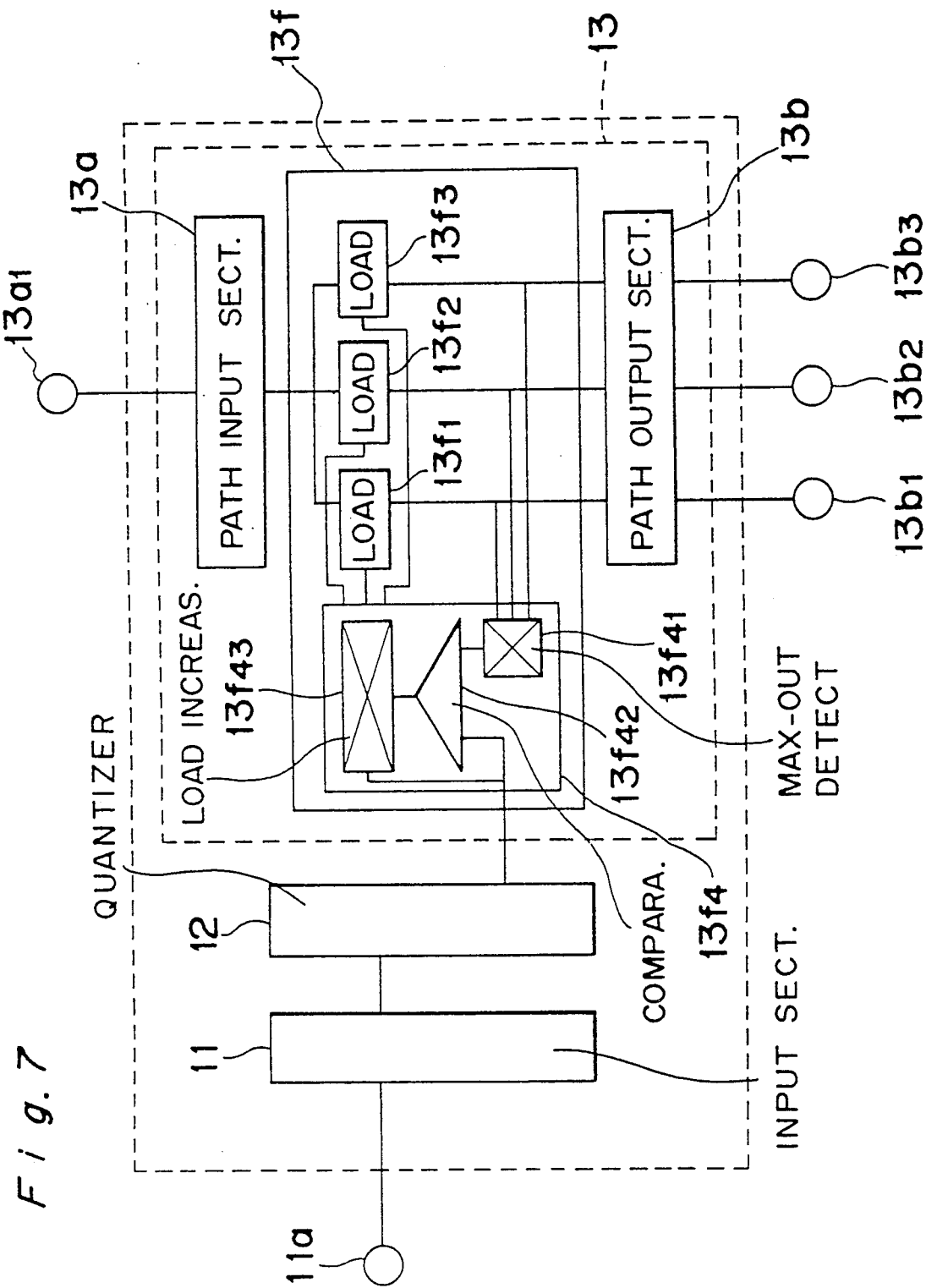
FIG. 7 is a diagram similar to FIG. 2, showing another modification of the recognition unit.

FIG. 7 schematically shows another modification of the recognition unit, which is generally used on a layer adjacent to the lowermost layer of a network constituting the apparatus. Similar to the recognition unit shown in FIG. 5, a path selecting section 13 comprises a path input section 13a having a path input terminal $13a_1$, a path output section 13b having a plurality of, for example three, output terminals $13b_1$, $13b_2$ and $13b_3$, and a path loading section 13f. Loads $13f_1$, $13f_2$ and $13f_3$ are weights to be applied to path output signals, which are outputted to the path output terminals $13b_1$, $13b_2$ and $13b_3$ of the path output section 13b, respectively. During learning, a learning device $13f_4$ changes the load strength, indicated by a value outputted from a quantizer 12, in the connection between the path input terminal and the path output terminals. During recognition, no signal is inputted into the quantizer 12, and the loads $13f_1$, $13f_2$ and $13f_3$ weight a path signal inputted from the path input section whereas the path output section 13b outputs weighted path signals to the path output terminals $13b_1$, $13b_2$ and $13b_3$.

The learning device $13f_4$ comprises a maximum-output-terminal detector $13f_{41}$ for detecting a path output terminal from which a maximum path signal is outputted, a comparator $13f_{42}$ for comparing the number of the path output terminal detected by the maximum-output-terminal detector $13f_{41}$ and that of the path output terminal indicated by the output value of the quantizer, and a load increaser $13f_{43}$ for increasing the load strength in the connection between the path input terminal of the path input section and the path output terminal of the path output section indicated by the output value of the quantizer on the basis of the result of comparison from the comparator $13f_{42}$. Furthermore, the comparator $13f_{42}$ performs a comparison between the number of the path output terminal detected by the maximum-output-terminal detector $13f_{41}$ and the output value of the quantizer 12, i.e., the number of a path output terminal indicated by a teacher signal. When the two numbers do not coincide with each other, the comparator $13f_{42}$ outputs "0", and the load increaser $13f_{43}$ increases the load strength in the connection between the path input terminal of the path input section and the path output terminal of the path output section indicated by the output value of the quantizer 12. In contrast, when the two numbers coincide with each other, the comparator 13$f_{42}$ outputs "1".

Figure 8:
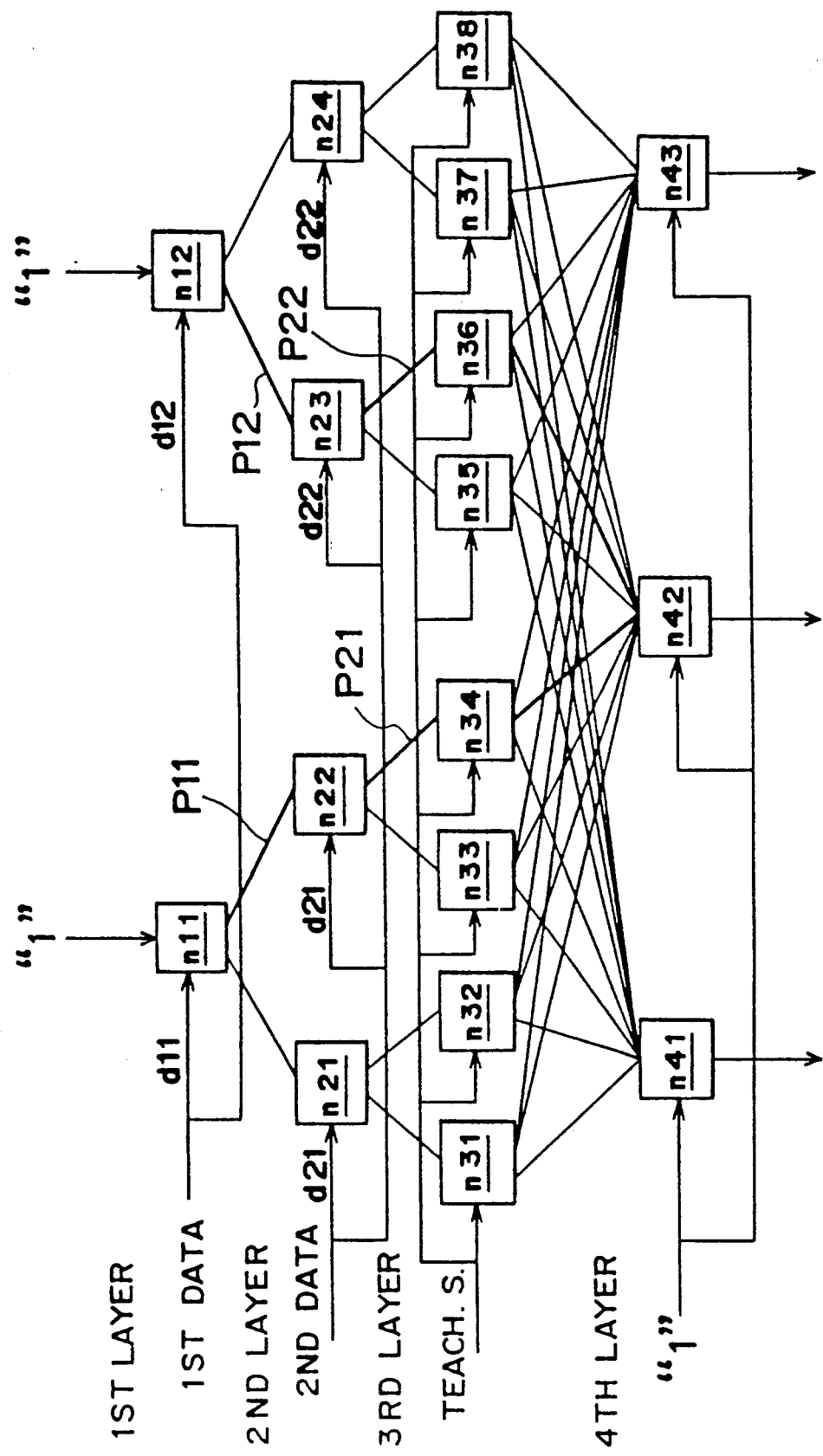
FIG. 8 is a block diagram of a recognizing and judging apparatus according to a first embodiment of the present invention.

FIG. 8 schematically shows a recognizing and judging apparatus according to a first embodiment of the present invention, in which a network is organized by appropriately connecting a plurality of recognition units in a multi-layered hierarchical structure. All the recognition units form two branched tree structures each having four layers. This recognizing and judging apparatus classifies objects to be recognized into three categories based on two characteristic data. The characteristic data to be judged are inputted into the signal input terminals 11$a$ of recognition units positioned on first and second layers.

The recognition unit as shown in FIG. 4 is preferably used as recognition units n11–n12 and n21–n24 constituting the first and second layers. The recognition unit as shown in FIG. 7 is preferably used as recognition units n31–n33 constituting a third layer. The recognition unit as shown in FIG. 6 is preferably used as recognition units n41–n43 constituting a fourth layer.

The learning operation of the recognizing and judging apparatus shown in FIG. 8 is as follows.

In the two branched tree structures, "1" is initially given as a path signal to the path input terminal of each of the recognition units n11 and n12 of the first layer. Two first characteristic data d11 and d12 of an object to be recognized are inputted into the signal input terminals leading to the quantizers of the recognition units n11 and n12, respectively. The first characteristic data are quantized by the quantizers of these units n11 and n12. Paths p11 and p12 are then selected by the switch shown in FIG. 4 based on respective values quantized, and the path signal "1" is sent to the path input terminal of each of the recognition units n22 and n23 of the second layer. Subsequently, two second characteristic data d21 and d22 of the object are inputted into the signal input terminals leading to the quantizers of the recognition units n21, n22 and n23, n24, respectively. The second characteristic data are quantized by the quantizers of the recognition units n21, n22 and n23, n24. Paths p21 and p22 are then selected by the switch shown in FIG. 4 based on respective values quantized, and the path signal "1" is sent to the path input terminal of each of the recognition units n34 and n36 positioned on the third layer.

At this time, the loads 13$f_1$, 13$f_2$ and 13$f_3$ of the recognition units n34 and n36 weight path signals inputted from respective path input sections 13$a$, and respective path output sections 13$b$ output weighted path signals to the path output terminals 13$b_1$, 13$b_2$ and 13$b_3$. The maximum-output-terminal detector 13$f_{41}$ detects the path output terminal from which the maximum path signal is outputted and inputs the number of the path output terminal detected to the comparator 13$f_{42}$. A teacher signal indicating which of three categories to be classified the object belongs to, namely, a signal indicating which of n41–n43 should be selected is inputted into the signal input terminal leading to the quantizer of each of these units. The comparator 13$f_{42}$ then performs a comparison between the number of the path output terminal detected by the maximum-output-terminal detector 13$f_{41}$ and the output value of the quantizer 12, i.e., the number of the path output terminal indicated by the teacher signal. When the two numbers do not coincide with each other, the comparator 13$f_{42}$ inputs "0" to the load increaser 13$f_{43}$, and the load increaser 13$f_{43}$ increases the load strength in the connection between the path input terminal of the path input section and the path output terminal of the path output section indicated by the teacher signal. In contrast, when the two numbers coincide with each other, the comparator 13$f_{42}$ inputs "1" to the load increaser 13$f_{43}$.

As described above, in the learning process of the recognizing and judging apparatus according to the present invention, connection paths between recognition units positioned on two adjoining layers are appropriately switched according to outputs of the quantizers of the recognition units organized in a multi-layered hierarchical network having the branched tree structures. On the layer adjacent to the lowermost layer, it is sufficient if the load strength in the connection between the path input terminal of the recognition unit and the path output terminal indicated by the output value of the quantizer is changed by the learning device, thereby enabling a considerably high speed learning.

The recognition operation is performed as follows by the apparatus according to the present invention.

Similar to the learning operation, in the two branched tree structures, "1" is initially given as a path signal to the path input terminal of each of the recognition units n11 and n12 of the first layer. The two first characteristic data d11 and d12 of the object to be recognized are inputted into the signal input terminals of the quantizers of the recognition units n11 and n12, respectively. The quantizers of the recognition units n11 and n12 quantize these characteristic data, and the connection paths p11 and p12 are selected by the switch shown in FIG. 4 based on values quantized. As a result, the path signal "1" is sent to each of the path input terminals of the recognition units n22 and n23 positioned on the second layer. When the two second characteristic data d21 and d22 of the object are inputted into the signal input terminals of the quantizers of the recognition units n21, n22 and n23, n24, respectively, the second characteristic data are quantized by the quantizers of the recognition units n21, n22 and n23, n24. The paths p21 and p22 are then selected by the switch shown in FIG. 4 based on respective values quantized, and the path signal "1" is sent to the path input terminal of each of the recognition units n34 and n36 of the third layer. During the recognition operation, no teacher signal is inputted to the signal input terminal of each of the recognition units n31–n38 of the third layer. Accordingly, the state of loads during the learning is maintained, and upon multiplication of the path input signals of respective recognition units by these loads, the path signals are led to the path input terminals of all the recognition units of the fourth layer. The adders of the recognition units of the fourth layer add the path signals inputted. Thereafter, a signal "1" is inputted into the signal input terminal of each signal input section, and the quantizer quantizes this signal so that the path selector may enable the path output. (When a signal "0" is inputted, the path selector switches so that the path output may be disabled.) The path signal obtained through the addition is sent to the path output section, which performs a threshold processing with respect thereto and outputs the result of the threshold processing to the path output terminal. Accordingly, when a signal value after the addition is greater than a certain threshold value, the signal is outputted from the path output terminal. In this way, objects to be recognized can be classified into respective appropriate categories for recognition and judgement thereof based on inputted characteristic data thereof. A sigmoid function, a step function or the like can be used as a function for performing the threshold processing.

As described above, in the recognizing process of the recognizing and judging apparatus according to the present invention, connection paths between recognition units positioned on two adjoining layers are appropriately switched according to outputs of the quantizers of the recognition units organized in a multi-layered hierarchical network having the branched tree structures. On the preceding layer of the lowermost layer, the result of recognition can be obtained merely by determining the path signals leading to the lowermost layer based on the loads set during the learning process. Accordingly, the recognition processing can be performed at a very high speed based on the result of learning.

Figure 9:
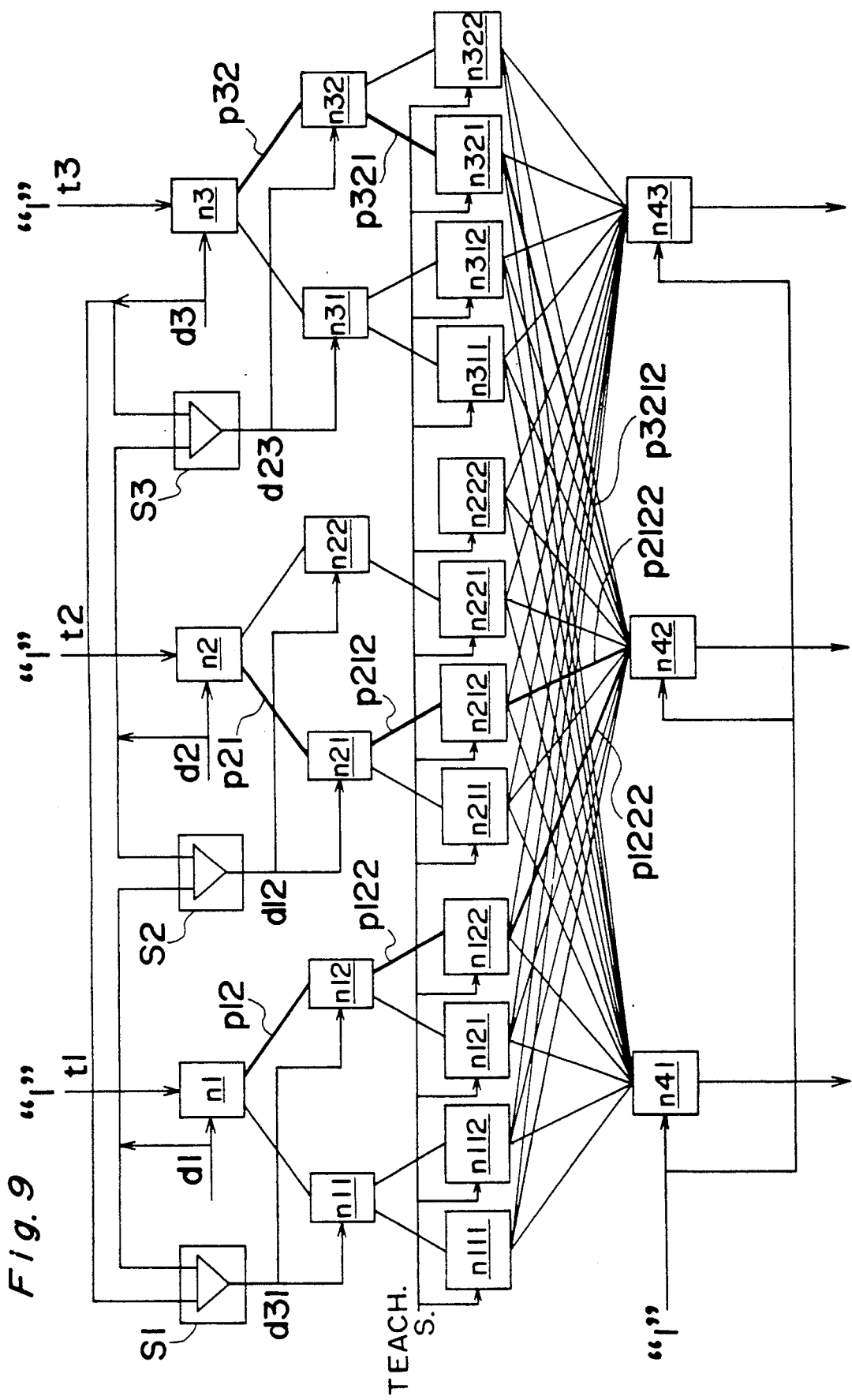
FIG. 9 is a block diagram of a recognizing and judging apparatus according to a second embodiment of the present invention.

FIG. 9 schematically shows a recognizing and judging apparatus according to a second embodiment of the present invention, in which a network is organized by appropriately connecting a plurality of recognition units in a multi-layered hierarchical structure. This network includes three branched tree structures t1, t2 and t3 each having four layers. The recognizing and judging apparatus shown in FIG. 9 classifies objects to be recognized into three categories based on three characteristic data. The three branched tree structures have respective differential measuring instruments s1, s2 and s3, on the first layer thereof, for performing operations required to obtain the difference between signals inputted into two adjoining recognition units positioned on the first layer. Outputs from the differential measuring instruments s1, s2 and s3 are inputted into signal input terminals of the corresponding recognition units of the second layer. The recognition unit as shown in FIG. 4 is preferably used as recognition units of the first and second layers. The recognition unit as shown in FIG. 7 is preferably used as recognition units of the third layer. The recognition unit as shown in FIG. 6 is preferably used as recognition units n41–n43 of the fourth layer.

The learning operation by the recognizing and judging apparatus shown in FIG. 9 is as follows.

In the three branched tree structures t1, t2 and t3, "1" is initially given as a path signal to the path input terminal of each of recognition units n1, n2 and n3 of the first layer. Three first characteristic data d1, d2 and d3 of an object to be recognized are inputted into the signal input terminals leading to the quantizers of the recognition units n1, n2 and n3, respectively. The first characteristic data are quantized by the quantizers of these units n1, n2 and n3. Paths p12, p21 and p32 are then selected by the switch shown in FIG. 4 based on respective values quantized, and the path signal "1" is sent to the path input terminal of each of the recognition units n12, n21 and n32 of the second layer. The three differential measuring instruments s1, s2 and s3 perform operations required to obtain the difference d31 between the characteristic data d3 and d1, the difference d12 between the characteristic data d1 and d2, and the difference d23 between the characteristic data d2 and d3, respectively. These differences d31, d12 and d23 are then inputted into the signal input terminals of the quantizers of recognition units n12, n21 and n32 of the second layer, respectively. The data d31, d12 and d23 are quantized by the quantizers of the recognition units n12, n21 and n32. Thereafter, paths p122, p212 and p321 are selected by the switch shown in FIG. 4 based on respective values quantized, and the path signal "1" is sent to the path input terminal of each of recognition units n122, n212 and n321 positioned on the third layer. Accordingly, upon detailed investigation of the differences among the characteristic data, the recognition units of the second layer can select the appropriate paths, thereby enhancing the recognition performance of the whole apparatus.

A teacher signal indicating which of three categories to be classified the object belongs to, namely, a signal indicating which of n41–n43 should be selected is inputted into the signal input terminal leading to the quantizer of the each of recognition units of the fourth layer. Based on the teacher signal, loads with respect to paths p1222, p2122 and p3212 are increased by a fixed value α.

As described above, according to the second embodiment of the present invention, during the learning process, the characteristic data of an object to be recognized are initially inputted into the signal input sections of the recognition units positioned on the first layer. At the same time, the differences between the characteristic data are inputted into the signal input sections of the recognition units positioned on the second layer. The connection paths between recognition units positioned on two adjoining layers are appropriately switched according to outputs of the quantizers of the recognition units. On the layer adjacent to the lowermost layer, it is sufficient if the paths leading to the lowermost layer are selected by the teacher signal. Accordingly, the learning processing can be performed at a very high speed.

Because the outputs from the differential measuring instruments are inputted into the signal input terminals of the recognition units of the second layer, these recognition units can select the appropriate paths after the detailed investigation of the differences between the characteristic data, and therefore, the recognition performance of the whole apparatus is considerably enhanced. Furthermore, when an additional learning is performed, it is fundamentally sufficient if the connection paths between the recognition units are added or changed. The recognizing and judging apparatus according to the present invention is, therefore, superior in the additional learning.

The recognition operation is performed by the apparatus shown in FIG. 9 as follows.

In the recognition units n1, n2 and n3 of the first layer and the recognition units n12, n21 and n32 of the second layer, the quantizers thereof quantize characteristic data inputted and change over respective switches based on outputs from the quantizers to successively select the paths p12, p21 and p32 and the paths p122, p212 and p321, which is similar to the learning operation. During the recognition operation, no teacher signal is inputted into the signal input terminals of the recognition units n122, n212 and n321 of the third layer. Accordingly, the state of loads during the learning is maintained, and upon multiplication of the path input signals of respective recognition units by these loads, the path signals are led to the path input terminals of all the recognition units of the fourth layer. The adders of the recognition units of the fourth layer add the path signals inputted. A signal "1" is inputted to the signal input terminal of each signal input section, and the quantizer quantizes this signal so that the path selector may enable the path output. (When a signal "0" is inputted, the path selector switches so that the path output may be disabled.) The path signal obtained through the addition is sent to the path output section, which performs a threshold processing with respect thereto and outputs the result of the threshold processing to the path output terminal. Accordingly, when a signal value after the addition is greater than a certain threshold value, the signal is outputted from the path output terminal. In this way, objects to be recognized can be classified into respective appropriate categories for recognition and judgement thereof based on inputted characteristic data thereof. In this case also, a Sigmoid function, a step function or the like can be used as a function for performing the threshold processing.

As described above, in the recognizing process of the recognizing and judging apparatus according to this embodiment of the present invention, the connection paths between the first and second layers are appropriately switched according to the outputs of the quantizers of the recognition units of the first layer. Characteristic data of the object, which differ from those inputted into the recognition units of the first layer, are inputted into signal input sections of the recognition units of the second layer, and the connection paths between the second and third layers are appropriately switched according to the outputs of the quantizers of the recognition units positioned on the second layer. On the layer adjacent to the lowermost layer, the result of recognition can be obtained merely by determining the path signals leading to the lowermost layer based on the loads set during the learning process. Accordingly, the recognition processing can be performed at a very high speed based on the result of learning.

Furthermore, because the outputs from the differential measuring instruments of the first layer are inputted into the signal input terminals of the recognition units of the next-lower layer, these recognition units can select the appropriate paths upon detailed investigation of the differences between the characteristic data. Accordingly, if the input signals vary to some extent, the recognition can be performed appropriately, thereby enhancing the performance of the whole apparatus.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A recognizing and judging apparatus having a network organized in a multilayered hierarchical manner and comprising:
   a given number of branched tree structures each having a plurality of layers, said given number being equal to a number of sets of characteristic data of an object to be recognized by said apparatus; and
   a plurality of recognition units constituting said branched tree structures and positioned in said plurality of layers, each of said recognition units comprising:
   a signal input section to which a signal is inputted;
   a quantizer for quantizing said signal input to said signal input section;
   a path input section having at least one path input terminal;
   a path output section having at least one path output terminal; and
   a path selecting section operatively coupled with both said path input section and said path output section for selectively providing connection therethrough between said at least one path input terminal and said at least one path output terminal according to an output of said quantizer;
   wherein a path selecting section of each of recognition units positioned on a layer adjacent to a lowermost layer of said plurality of layers comprises a learning device for changing a strength of said connection between said at least one path input terminal and a path output terminal indicated by the output of said quantizer;
   wherein said learning device comprises a maximum-output-terminal detector for detecting a path output terminal from which a maximum path signal is outputted, a comparator for comparing a number assigned to the path output terminal detected by said maximum-output-terminal detector and a number assigned to a path output terminal indicated by the output of said quantizer, and a load increaser for increasing a strength of connection between said path input terminal and said path output terminal indicated by the output of said quantizer based on a result of comparison performed by said comparator.

2. The apparatus according to claim 1, wherein said comparator outputs a first signal when the number assigned to the path output terminal detected by said maximum-output-terminal detector does not coincide with the number assigned to a path output terminal indicated by the output of said quantizer, and outputs a second signal when both the numbers coincide with each other, and wherein said load increaser increases the strength of connection between said path input terminal and said path output terminal indicated by the output of said quantizer when said comparator outputs said first signal.

3. A recognizing and judging apparatus having a network organized in a multilayered hierarchical manner and comprising:
   a given number of branched tree structures each having a plurality of layers, said given number being equal to a number of sets of characteristic data of an object to be recognized by said apparatus; and
   a plurality of recognition units constituting said branched tree structures and positioned in said plurality of layers, each of said recognition units comprising:
   a signal input section to which a signal is inputted;
   a quantizer for quantizing said signal input to said signal input section;
   a path input section having at least one path input terminal;
   a path output section having at least one path output terminal; and
   a path selecting section operatively coupled with both said path input section and said path output section for selectively providing connection therethrough between said at least one path input terminal and said at least one path output terminal according to an output of said quantizer; and
   a plurality of differential calculators for performing respective operations required to obtain differential values between signals inputted into recognition units positioned in a same layer in two adjacent branched trees structures, and wherein a differential calculator is provided in each tree structure, and an output therefrom is inputted into said signal input terminals of recognition units located in a next-lower layer.

* * * * *